(12) United States Patent
Decarreau et al.

(10) Patent No.: US 12,490,119 B2
(45) Date of Patent: Dec. 2, 2025

(54) ADAPTING OPERATION OF AN APPARATUS

(71) Applicant: Nokia Solutions and Networks Oy, Espoo (FI)

(72) Inventors: Guillaume Decarreau, Munich (DE); Alistair Urie, Issy les Moulineaux (FR)

(73) Assignee: Nokia Solutions and Networks Oy, Espoo (FI)

( * ) Notice: Subject to any disclaimer, the term of this patent is extended or adjusted under 35 U.S.C. 154(b) by 483 days.

(21) Appl. No.: 17/995,251

(22) PCT Filed: Mar. 29, 2021

(86) PCT No.: PCT/IB2021/052583
§ 371 (c)(1),
(2) Date: Sep. 30, 2022

(87) PCT Pub. No.: WO2021/198879
PCT Pub. Date: Oct. 7, 2021

(65) Prior Publication Data
US 2023/0180028 A1    Jun. 8, 2023

(30) Foreign Application Priority Data

Apr. 2, 2020   (FI) .................................... 20205336

(51) Int. Cl.
*H04W 88/08* (2009.01)
*H04W 8/22* (2009.01)
*H04W 24/02* (2009.01)

(52) U.S. Cl.
CPC ............. *H04W 24/02* (2013.01); *H04W 8/22* (2013.01)

(58) Field of Classification Search
CPC ..... H04W 24/02; H04W 8/22; H04W 88/085; H04W 48/08; H04W 48/18; H04L 41/082; H04L 41/0853
See application file for complete search history.

(56) References Cited

U.S. PATENT DOCUMENTS

| | | | |
|---|---|---|---|
| 2016/0112943 A1* | 4/2016 | Horn | H04W 72/20 370/329 |
| 2017/0019780 A1* | 1/2017 | Hsu | H04W 8/22 |
| 2019/0215729 A1 | 7/2019 | Oyman et al. | |

(Continued)

FOREIGN PATENT DOCUMENTS

| | | |
|---|---|---|
| CN | 105210345 A | 12/2015 |
| CN | 109526252 A | 3/2019 |

(Continued)

OTHER PUBLICATIONS

"O-RAN Minimum Viable Plan and Acceleration towards Commercialization", O-RAN Alliance, White Paper, Jun. 29, 2021, pp. 1-26.

(Continued)

*Primary Examiner* — Joseph E Dean, Jr.
(74) *Attorney, Agent, or Firm* — Nokia Technologies Oy (57) ABSTRACT

An apparatus, method and computer program product for: interfacing with a radio access network, receiving interface configuration information relating to one or more capabilities of the radio access network, and adapting operation of the apparatus based on the interface configuration information.

13 Claims, 2 Drawing Sheets

(56) References Cited

U.S. PATENT DOCUMENTS

2019/0357036 A1   11/2019   Leung
2019/0364611 A1   11/2019   Centonza et al.

FOREIGN PATENT DOCUMENTS

| | | |
|---|---|---|
| CN | 110636575 A | 12/2019 |
| EP | 3448115 A1 | 2/2019 |
| EP | 3567884 A1 | 11/2019 |
| EP | 3720181 A1 | 10/2020 |
| EP | 3790319 A1 | 3/2021 |
| WO | 2013/135914 A2 | 9/2013 |
| WO | 2016/195640 A1 | 12/2016 |
| WO | 2017/125047 A1 | 7/2017 |
| WO | 2018/126823 A1 | 7/2018 |
| WO | 2019/105095 A1 | 6/2019 |
| WO | 2019/141894 A1 | 7/2019 |
| WO | 2019/242749 A1 | 12/2019 |
| WO | 2020/040723 A1 | 2/2020 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.4.0, Dec. 2018, pp. 1-933.
"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.
Office action received for corresponding Finnish Patent Application No. 20205336, dated Nov. 19, 2020, 6 pages.
"O-RAN: Towards an Open and Smart RAN", O-RAN Alliance, White Paper, Oct. 2018, pp. 1-19.
Office action received for corresponding Finnish Patent Application No. 20205336, dated Apr. 30, 2021, 6 pages.
International Search Report and Written Opinion received for corresponding Patent Cooperation Treaty Application No. PCT/IB2021/052583, dated Jun. 10, 2021, 14 pages.
Czichy, "5G RAN optimization using the O-RAN software community's RIC (RAN Intelligent Controller)", Nokia, Sep. 23, 2019, pp. 1-23.
Office action received for corresponding European Patent Application No. 21715976.3, dated Nov. 27, 2024, 9 pages.
Office action received for corresponding Chinese Patent Application No. 202180033842.5, dated Mar. 31, 2025, 10 pages of office action and 6 pages of summary and translation available.
Office action received for corresponding Chinese Patent Application No. 202180033842.5, dated Aug. 29, 2025, 10 pages of office action and 9 pages of translation available.

* cited by examiner

ADAPTING OPERATION OF AN APPARATUS

RELATED APPLICATION

This application was originally filed as PCT Application No. PCT/IB2021/052583, filed on Mar. 29, 2021, which claims priority to FI Application No. 20205336, filed on Apr. 2, 2020, each of which is incorporated herein by reference in its entirety.

RELATED APPLICATION

This application claims priority to Finnish Application Serial No. 20205336, filed on Apr. 2, 2020, which is incorporated herein by reference in its entirety.

TECHNICAL FIELD

The present application relates generally to adapting operation of an apparatus. More specifically, the present application relates to adapting operation of an apparatus based on interface configuration information.

BACKGROUND

Networks are coming more and more complex, and new technologies such as autonomous driving and internet of things (IoT) cause different kinds of requirements for radio access networks (RAN). At the same time, users consume and generate more and more content, while expecting low latency and good quality of experience.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: interfacing with a radio access network, receiving interface configuration information relating to one or more capabilities of the radio access network, and adapting operation of the apparatus based on the interface configuration information.

According to a second aspect of the invention, there is provided a method comprising: interfacing with a radio access network, receiving interface configuration information relating to one or more capabilities of the radio access network, and adapting operation of the apparatus based on the interface configuration information.

According to a third aspect of the invention, there is provided a computer program comprising instructions for causing an apparatus to perform at least the following: interfacing with a radio access network, receiving interface configuration information relating to one or more capabilities of the radio access network, and adapting operation of the apparatus based on the interface configuration information.

According to a fourth aspect of the invention, there is provided an apparatus comprising at least one processor and at least one memory including computer program code, the at least one memory and the computer program code configured to with the at least one processor, cause the apparatus at least to: interface with a radio access network, receive interface configuration information relating to one or more capabilities of the radio access network, and adapt operation of the apparatus based on the interface configuration information.

According to a fifth aspect of the invention, there is provided a non-transitory computer readable medium comprising program instructions for causing an apparatus to perform at least the following: interfacing with a radio access network, receiving interface configuration information relating to one or more capabilities of the radio access network, and adapting operation of the apparatus based on the interface configuration information.

According to a sixth aspect of the invention, there is provided a computer readable medium comprising program instructions for causing an apparatus to perform at least the following: interfacing with a radio access network, receiving interface configuration information relating to one or more capabilities of the radio access network, and adapting operation of the apparatus based on the interface configuration information.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment Single features of different embodiments may also be combined to provide other embodiments.

Example embodiments relate to forwarding messages between a terminal device and an apparatus by a radio access network (RAN). The apparatus may comprise, for example, a RAN intelligent controller (RIC).

According to an example embodiment, an apparatus is configured to interface with a radio access network, receive interface configuration information relating to one or more capabilities of the radio access network, and adapt operation of the apparatus based on the interface configuration information.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
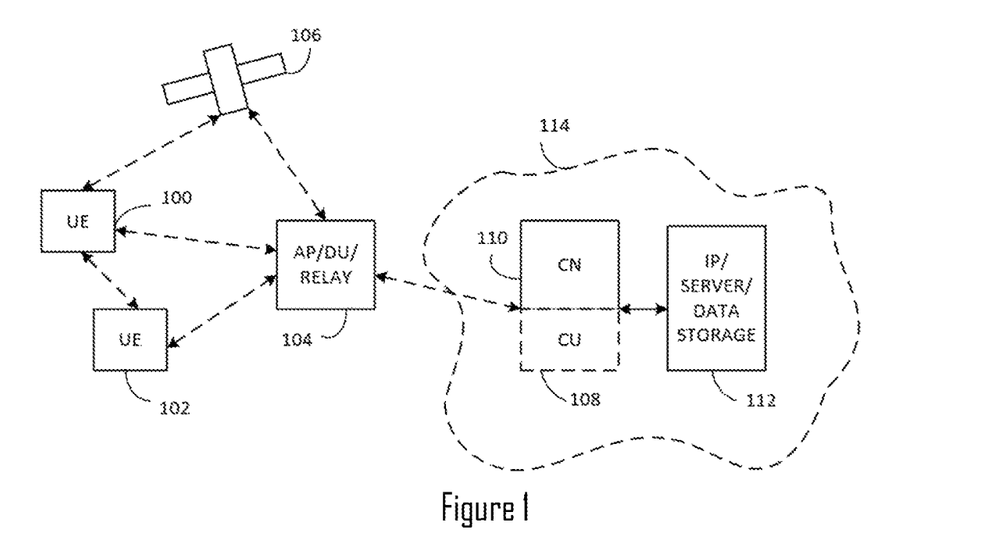
FIG. 1 shows a part of an exemplifying radio access network in which examples of disclosed embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g) NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. As further examples, the counterpart on the CN side can be an access and mobility management function (AMF), a session management function (SMF), or a user plane function (UPF).

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As commonly known in connection with wireless communication systems, control or management information is transferred over a radio interface, e.g. between the terminal device 100 and the access node 104.

As networks become more and more complex due to a need to support different kinds of applications, managing and optimizing network operations also becomes more difficult Therefore, more intelligent networks are needed in terms of networks being capable of utilizing, for example, machine learning or deep learning for enabling autonomous and automatic network operations.

Intelligent networks may be provided utilizing an intelligent controller such as a RAN intelligent controller (RIC). For example, a RIC near-real time (near-RT RIC) is configured to provide selected radio resource management (RRM) functions or other radio access network functionality with embedded intelligence or to provide services used for guiding or modifying radio resource management (RRM) functions or other radio access network functionality within a plurality of (e/g)NodeBs. A near-RT RIC is configured to utilize big data and machine learning and support, for example, optimization of radio connection management, mobility management, quality of service (QoS) management, and interference management.

A near-RT RIC is configured interface with a RAN via a dedicated interface. The dedicated interface may comprise, for example, E2 interface of O-RAN Alliance specifications. The E2 interface is configured to feed data such as various RAN measurements to the near-RT RIC in order to facilitate RRM and serve as an interface through which the near-RT RIC may initiate configuration commands directly to a centralized unit (CU) or a distributed unit (DU) of a RAN.

RRM may be implemented using a radio resource control (RRC) protocol that comprises functions relating to communication between a terminal device and a RAN such as a gNodeB or eNodeB. For example, RRC comprises connection establishment and release functions, broadcast of system information (SI), and radio bearer establishment, reconfiguration and release between a terminal device and a RAN.

A near-RT RIC is configured to implement 3rd party applications that may be used for, for example, managing certain aspects of a RAN such as delivering video more efficiently or the like. The 3rd party applications are configured to receive information from terminal devices via the RAN. For example, a terminal device such as UE may send a performance measurement report as an RRC message to the RAN. The performance measurement report may comprise measurement results performed by the terminal device and the message may be encoded with an interface description language such as abstract syntax notation one (ASN.1). The RAN includes the performance measurement report in the RAN's ASN.1 encoding and delivers the performance measurement report to the near-RT RIC. However, the versions of the interface description languages understood by the terminal device and the RAN may be different and therefore, it may be that useful data is not delivered from the RAN to the near-RT RIC. On the other hand, the near-RT RIC may send a message to the terminal device for triggering a feature that is not supported by the RAN. This may lead to an unpredictable behaviour of the terminal device that the RAN cannot understand.

Figure 2:
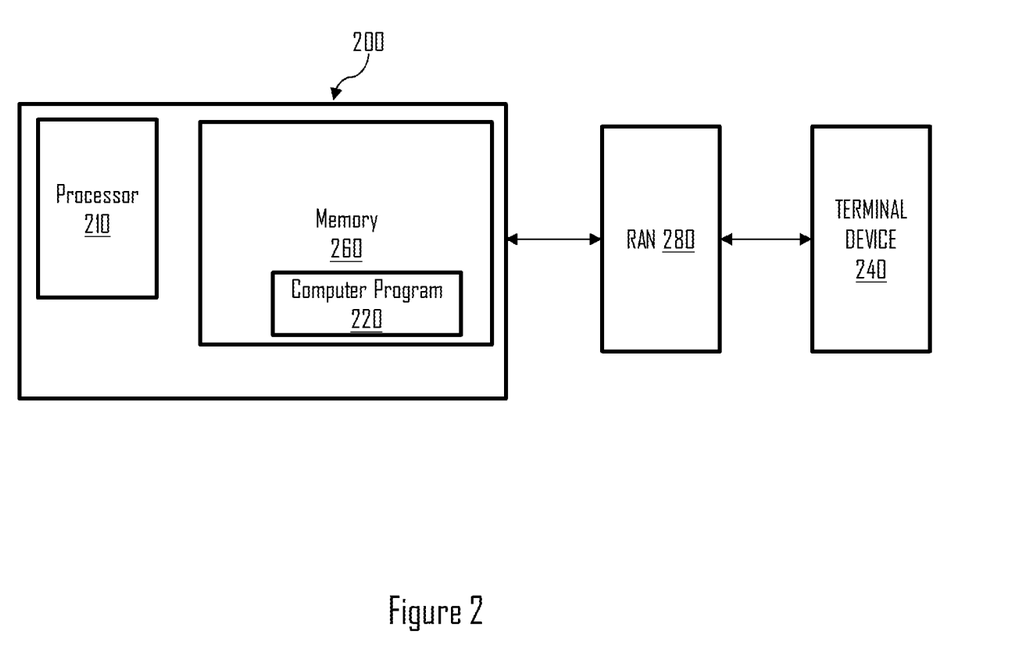
FIG. 2 shows a block diagram of an example apparatus in which examples of the disclosed embodiments may be applied.

FIG. 2 is a block diagram depicting an apparatus 200 operating in accordance with an example embodiment of the invention. The apparatus 200 may be, for example, an electronic device such as a chip, chip-set, an electronic device or a network function. In the example of FIG. 2, the apparatus 200 comprises a radio access network (RAN) intelligent controller (RIC). For example, the apparatus 200 may comprise a near-real-time RIC (near-RT RIC). A near-RT RIC is a logical function that enables near-real-time control and optimization of RAN elements and resources using data collection and actions over an E2 interface of O-RAN Alliance specifications.

In the example of FIG. 2, the apparatus 200 comprises one or more control circuitry, such as at least one processor 210, and at least one memory 260, including one or more algorithms such as a computer program instructions 220 wherein the at least one memory 260 and the computer program instructions 220 are configured, with the at least one processor 210 to cause the apparatus 200 to carry out any of the example functionalities described below.

In the example of FIG. 2, the processor 210 is a central unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 is configured to communicate with at least one RAN 280 such as a gNodeB or eNodeB and a terminal device 240. The terminal device 240 may comprise, for example, user equipment (UE). For example, the RAN 280 may be configured to forward performance measurement reports from the terminal device 240 to the apparatus 200 and radio resource control (RRC) messages from the apparatus 200 to the terminal device 240.

According to an example embodiment, the apparatus 200 comprises a RAN intelligent controller (RIC). The RIC is configured to provide radio resource management (RRM) functions or other radio access network functionality with embedded intelligence. RRM may be implemented using radio resource control (RRC). According to an example embodiment, the RAN intelligent controller comprises a near-real-time (near-RT) RIC.

According to an example embodiment, the apparatus 200 is configured to interface with a radio access network (RAN) 280. The apparatus 200 may be configured to interface with one or more RAN components. For example, the apparatus 200 may be configured to interface with a centralized unit (CU) of the RAN and/or one or more distributed units (DUs) of the RAN. According to an example embodiment, the apparatus 200 is configured to interface with the RAN 280 via an E2 interface of O-RAN Alliance specifications.

According to an example embodiment, the apparatus 200 is configured to receive interface configuration information relating to one or more capabilities of the radio access network 280. The interface configuration information may be received from the RAN 280 or from a separate network function.

The apparatus 200 may be configured to receive the interface configuration information during, concurrently with or after an interface setup procedure. According to an example embodiment, the apparatus 200 is configured to receive the interface configuration information during or after an interface setup procedure for setting up an E2 interface of O-RAN Alliance specifications. For example, the apparatus 200 may be configured to receive the interface configuration information during or after an interface setup procedure for setting up an E2 interface of O-RAN Alliance specifications between the apparatus 200 and the RAN 280.

The interface configuration information may comprise information relating to a radio interface between a terminal device and the RAN 280. According to an example embodiment, the interface configuration information comprises description of a supported radio interface between the terminal device and the RAN and supported features.

The interface configuration information may comprise information on a suitable way of communicating with the RAN. Information on a suitable way of communicating may comprise information relating to a version of an interface description language, types of messages understood by the RAN, types information elements understood by the RAN, or the like.

According to an example embodiment, the interface configuration information comprises at least one protocol supported by the radio access network 280, the at least one protocol relating to a radio interface between a terminal device and the RAN 280.

According to an example embodiment, the at least one protocol comprises a version of an interface description language. The interface description language may comprise, for example, abstract syntax notation one (ASN.1).

Without limiting the scope of the claims, an advantage of ASN.1 interface description language is that the description of data encoding is independent of a particular computer or programming language.

According to an example embodiment, the interface configuration information comprises at least one feature supported by the radio access network, the at least one feature relating to a radio interface between a terminal device and the radio access network.

The at least one feature supported by the radio access network may comprise, for example, one or more message types understood by the RAN and/or one or more information elements that may be used by the apparatus 200 is a message to the terminal device.

According to an example embodiment, the at least one feature supported by the radio access network comprises a list of messages supported by the radio access network. According to an example embodiment, the list of messages supported by the radio access network comprises a list of messages that can be forwarded by the radio access network from the terminal device to the apparatus 200. According to another example embodiment, the list of messages supported by the radio access network comprises a list of messages that can be forwarded by the radio access network from the apparatus 200 to the terminal device. According to a further example embodiment, the list of messages supported by the radio access network comprises a list of messages that can be forwarded by the radio access network from the terminal device to the apparatus 200 and a list of messages that can be forwarded by the radio access network from the apparatus 200 to the terminal device.

According to an example embodiment the list of messages comprises a list of downlink messages or a list of uplink messages. A list of uplink messages may comprise, for example, a subset of common control channel (CCCH) messages or dedicated control channel (DCCH) messages. For example, a list of uplink CCCH messages may comprise RRCSetupRequest, RRCResumeRequest, RRCReestablishmentRequest and/or RRCSystemInfoRequest of O-RAN Alliance specifications. A list of uplink DCCH messages may comprise, for example, MeasurementReport, RRCReconfigurationComplete, RRCSetupComplete, RRCReestablishmentComplete, RRCResumeComplete, SecurityModeComplete, SecurityModeFailure, ULInformationTransfer, LocationMeasurementIndication, UE CapabilityInformation, CounterCheckResponse, UEAssistanceInformation, and/or FailureInformation of O-RAN Alliance specifications.

A list of downlink messages may comprise, for example, a subset of common control channel (CCCH) messages or dedicated control channel (DCCH) messages. For example, a list of downlink CCCH messages may comprise RRCReject and/or RRCSetup of O-RAN Alliance specifications. A list of downlink DCCH messages may comprise, for example, RRCReconfiguration, RRCResume, RRCRelease, RRC Re establishment, SecurityModeCommand, DLInformationTransfer, UE CapabilityEnquiry, CounterCheck, and/or MobilityFromNRCommand of O-RAN Alliance specifications.

According to an example embodiment a message comprises information on which part of the message is understood by the radio access network. A part understood by the radio access network may be indicated by indicating one or more parts of the message that the radio access network understands or indicating one or more parts of the message that the radio access network does not understand. The radio access network may be configured to indicate a part understood by the radio access network, for example, by sending source code of the understandable part of the interface configuration information to the apparatus 200. As another example, the radio access network may be configured to indicate a part not understood by the radio access network by a strikethrough of the part of the message.

According to another example embodiment, the at least one feature supported by the radio access network 280 comprises a list of information elements supported by the radio access network 280 in a message from the apparatus 200 to a terminal device. An information element may comprise information that may be included within a signalling message or data flow sent across an interface such as an E2 interface of O-RAN Alliance specifications.

According to an example embodiment, the interface configuration information comprises at least one capability of a terminal device. According to an example embodiment, the at least one capability of a terminal device comprises a version of the interface configuration information.

According to an example embodiment, the apparatus 200 is configured to adapt operation of the apparatus 200 based on the interface configuration information. Adapting operation of the apparatus 200 may comprise, for example, adapting one or more functions of the apparatus 200.

Adapting operation of the apparatus 200 may comprise adapting an operation relating to sending one or more messages to a terminal device and/or an operation relating to receiving one or more messages from a terminal device.

According to an example embodiment, adapting the operation comprises avoiding sending a message comprising a feature that is not supported by the radio access network 280 to the terminal device. The apparatus 200 may be configured to determine one or more features that are not supported by the radio access network 280 based on the interface configuration information.

According to an example embodiment, adapting the operation comprises skipping information in a message that is not supported by the radio access network. The apparatus 200 may be configured to determine information that is not supported by the radio access network 280 based on the interface configuration information.

According to an example embodiment, the apparatus 200 comprises means for performing the features of the claimed invention, wherein the means for performing comprises at least one processor 110, at least one memory 160 including computer program code 120, the at least one memory 160 and the computer program code 120 configured to, with the at least one processor 110, cause the performance of the apparatus 200. The means for performing the features of the claimed invention may comprise means for interfacing with the radio access network, means for receiving interface configuration information relating to one or more capabilities of the radio access network, and means for adapting operation of the apparatus based on the interface configuration information. The apparatus 200 may further comprise means for receiving interface configuration information during or after an interface setup procedure.

Figure 3:
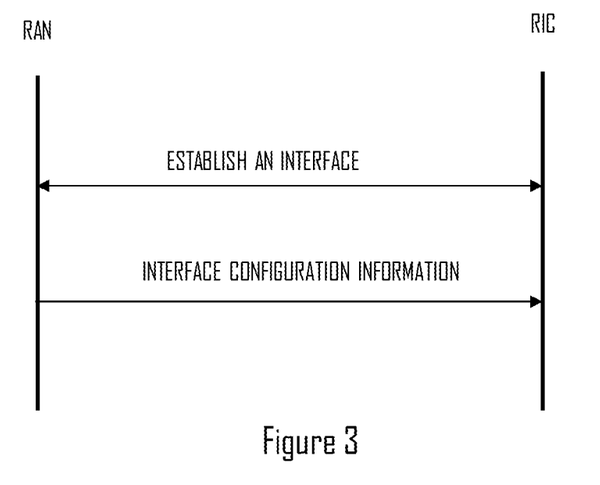
FIG. 3 illustrates an example signalling diagram incorporating aspects of the examples of the invention.

FIG. 3 illustrates an example signalling diagram depicting actions performed by the apparatus 200 of FIG. 2. In the example of FIG. 3, it is assumed that the apparatus 200 comprises a RAN intelligent controller (RIC).

The apparatus 200 is configured interface with the radio access network (RAN). The interface is setup may be initiated by the apparatus 200 or the RAN. The apparatus 200 is further configured to receive interface configuration information relating to one or more capabilities of the RAN. The interface configuration information may comprise, for example, a version of an interface description language supported by the RAN, a list messages supported by the RAN or a list of information elements supported by the RAN.

The apparatus 200 is configured to adapt the operation of the apparatus 200 based on the received information. Adapting the operation of the apparatus 200 may comprise, for example, avoiding sending a message comprising a feature that is not supported by the RAN and/or skipping information in a message that is not supported by the radio access network.

Figure 4:
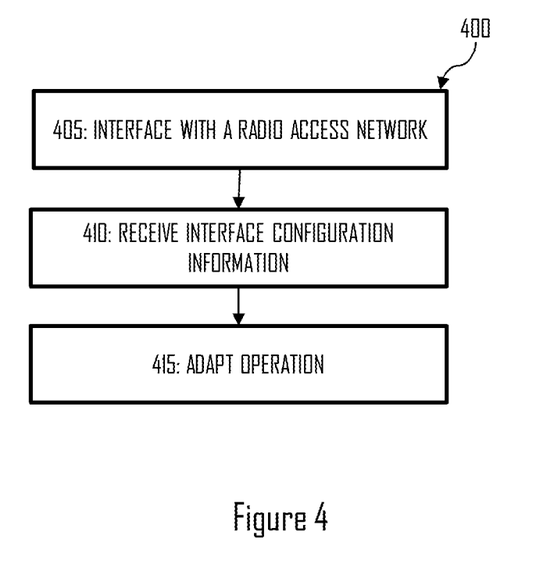
FIG. 4 illustrates an example method according to an example embodiment of the invention.

FIG. 4 illustrates a method 400 incorporating aspects of the previously disclosed embodiments. In the example of FIG. 4, the method is performed by the apparatus 200 such as a RAN intelligent controller (RIC).

The method starts with interfacing 405 with a radio access network. Interfacing with a radio access network (RAN) may comprise setting up an interface with the RAN.

The method continues with receiving 410 interface configuration information relating to one or more capabilities of the RAN. The interface configuration information may comprise, for example, at least one protocol and/or at least one feature supported by the RAN. The at least one protocol relating to a radio interface may comprise a protocol relating to a radio interface between a terminal device and the RAN. The at least one protocol may comprise, for example, a version of an interface description language. The at least one message may comprise, for example, a list of uplink messages and/or a list of downlink messages supported by the RAN. A message may comprise information on which part of the message is understood by the RAN.

The method further continues with adapting 415 operation of the apparatus 200 based on the interface configuration information. Adapting operation of the apparatus 200 may comprise, for example, avoiding sending a message comprising a feature that is not supported by the RAN to a terminal device and/or skipping information in a message that is not supported by the RAN.

Without limiting the scope of the claims, an advantage of adapting, based on received interface configuration information, operation of the apparatus may be that capabilities of a radio access network forwarding messages between a terminal device and the apparatus may be taken into account.

Without in any way limiting the scope, interpretation, or application of the claims appearing below, a technical effect of one or more of the example embodiments disclosed herein is that unpredictable terminal behaviour and/or loss of information may be at least partially avoided.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. A radio access network (RAN) intelligent controller comprising:
at least one processor and at least one memory including computer program code, the computer program code, when executed by the at least one processor, configured to cause the at least one processor at least to:

receive interface configuration information relating to one or more capabilities of a radio access network, wherein the interface configuration information includes configuration information for an interface between the RAN intelligent controller and the radio access network; and adapt operation of the RAN intelligent controller based on the interface configuration information by operating the RAN intelligent controller according to the one or more capabilities of the radio access network.

2. The RAN intelligent controller according to claim 1, wherein the interface configuration information comprises at least one protocol supported by the radio access network, the at least one protocol relating to a radio interface between a terminal device and the radio access network.

3. The RAN intelligent controller according to claim 2, wherein the at least one protocol comprises a version of an interface description language.

4. The RAN intelligent controller according to claim 1, wherein the interface configuration information comprises at least one feature supported by the radio access network, the at least one feature relating to a radio interface between a terminal device and the radio access network.

5. The RAN intelligent controller according to claim 4, wherein the at least one feature supported by the radio access network comprises a list of messages supported by the radio access network.

6. The RAN intelligent controller according to claim 5, wherein the list of messages comprises a list of downlink messages or a list of uplink messages.

7. The RAN intelligent controller according to claim 5, wherein a message comprises information on which part of the message is understood by the radio access network.

8. The RAN intelligent controller according to claim 4, wherein the at least one feature supported by the radio access network comprises a list of information elements supported by the radio access network in a message from the RAN intelligent controller to a terminal device.

9. The RAN intelligent controller according to claim 1, wherein adapting the operation comprises avoiding sending a message comprising a feature that is not supported by the radio access network to a terminal device.

10. The RAN intelligent controller according to claim 1, wherein adapting the operation comprises skipping information in a message that is not supported by the radio access network.

11. The RAN intelligent controller according to claim 1, wherein the interface configuration information comprises at least one capability of a terminal device.

12. The RAN intelligent controller according to claim 1, wherein the at least one memory and the computer program code are configured to with the at least one processor, cause the RAN intelligent controller to receive the interface configuration information during or after an interface setup relating to end-to-end (E2) interface of Open (O)-Radio Access Network (RAN) Alliance specifications.

13. A method for a radio access network (RAN) intelligent controller, the method comprising:

receiving, by a processor of the RAN intelligent controller, interface configuration information relating to one or more capabilities of a radio access network, wherein the interface configuration information includes configuration information for an interface between the RAN intelligent controller and the radio access network; and adapting, by the processor, operation of the RAN intelligent controller based on the interface configuration information by operating the RAN intelligent controller according to the one or more capabilities of the radio access network.

* * * * *